(No Model.) 6 Sheets—Sheet 1.

J. W. EVANS.
APPARATUS FOR EXTRACTING OIL FROM SEED.

No. 245,365. Patented Aug. 9, 1881.

WITNESSES
R. Koehler
W. Engel

INVENTOR
John W. Evans
By Leggett & Leggett
ATTORNEYS (No Model.)
6 Sheets—Sheet 2.
J. W. EVANS.
APPARATUS FOR EXTRACTING OIL FROM SEED.
No. 245,365.  Patented Aug. 9, 1881.
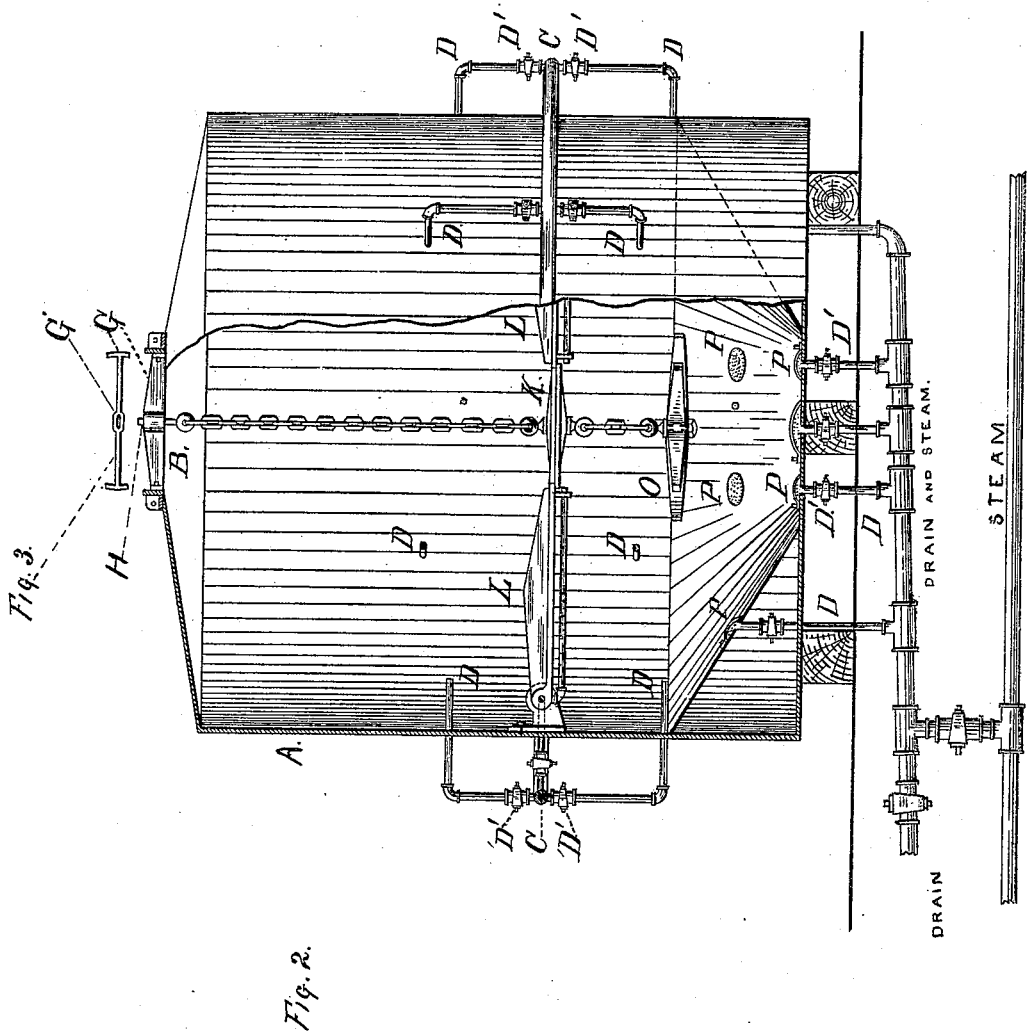
WITNESSES
R. Kochler.
O. H. Engel
INVENTOR
John W. Evans
By Leggett & Leggett
ATTORNEYS (No Model.)
6 Sheets—Sheet 3.
J. W. EVANS.
APPARATUS FOR EXTRACTING OIL FROM SEED.
No. 245,365.  Patented Aug. 9, 1881.
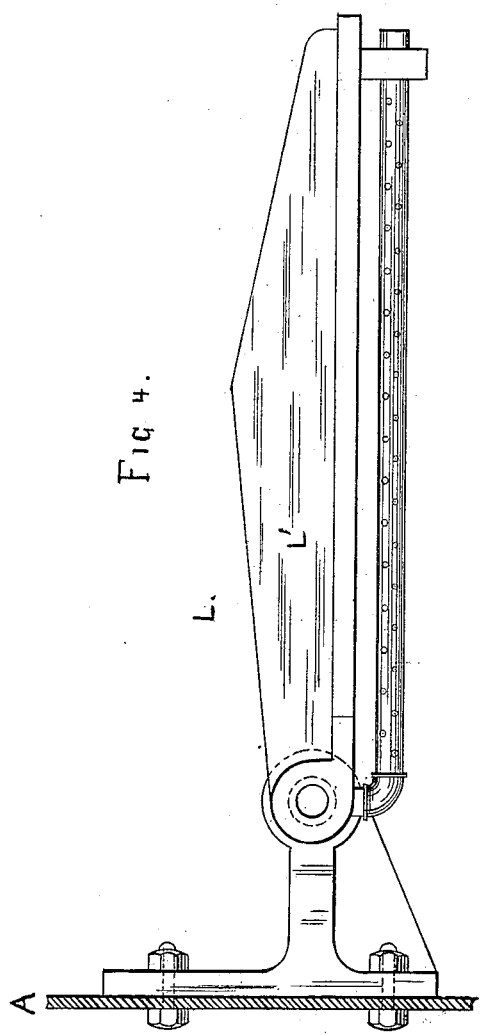
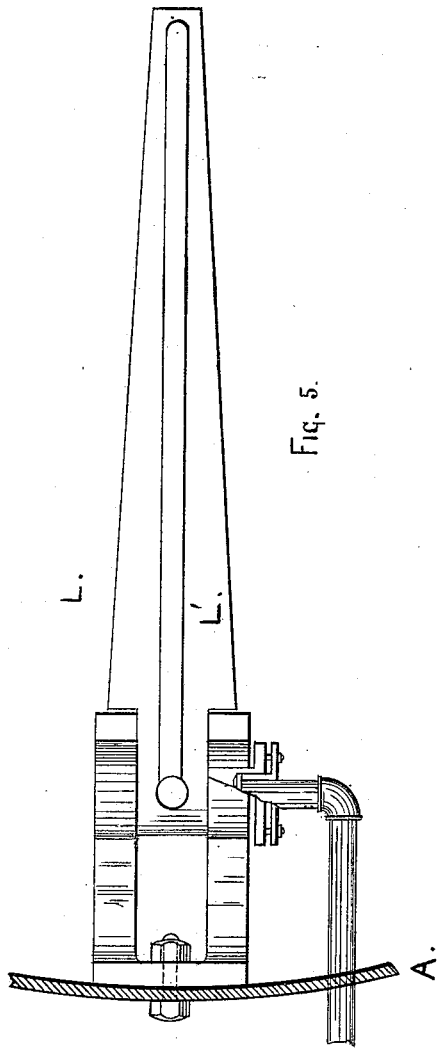
WITNESSES
INVENTOR
ATTORNEYS (No Model.) 6 Sheets—Sheet 4.
J. W. EVANS.
APPARATUS FOR EXTRACTING OIL FROM SEED.

No. 245,365. Patented Aug. 9, 1881.

WITNESSES
P. Koehler.
W. Engel

INVENTOR
John W. Evans,
By Leggett & Leggett,
ATTORNEYS

N. PETERS, Photo-Lithographer, Washington, D. C.

(No Model.)

6 Sheets—Sheet 5.

J. W. EVANS.
APPARATUS FOR EXTRACTING OIL FROM SEED.

No. 245,365.  Patented Aug. 9, 1881.

(No Model.) 6 Sheets—Sheet 6.
J. W. EVANS.
APPARATUS FOR EXTRACTING OIL FROM SEED.
No. 245,365. Patented Aug. 9, 1881.
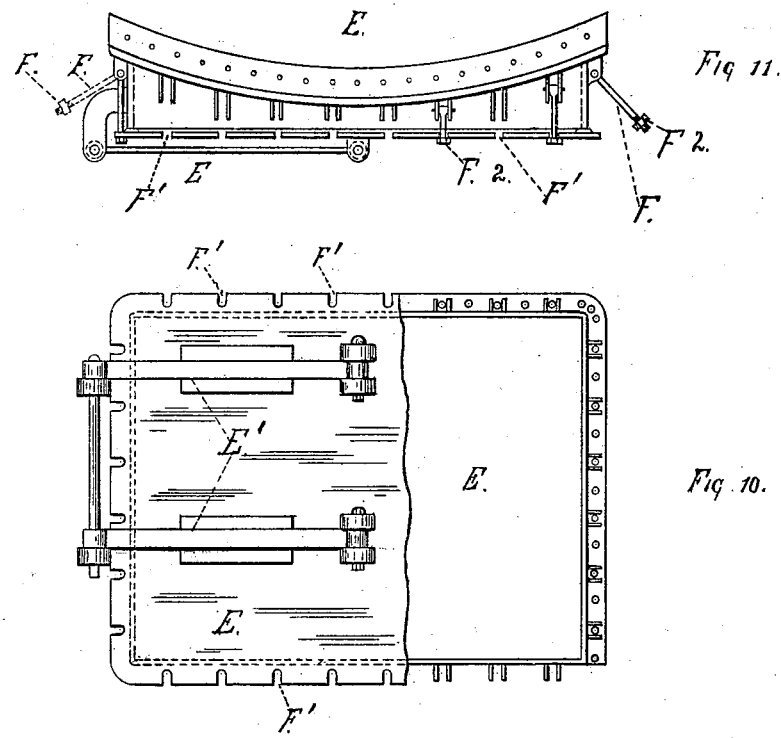

UNITED STATES PATENT OFFICE.

JOHN W. EVANS, OF CLEVELAND, OHIO.

APPARATUS FOR EXTRACTING OIL FROM SEED.

SPECIFICATION forming part of Letters Patent No. 245,365, dated August 9, 1881.

Application filed March 10, 1881. (No model.)

*To all whom it may concern:*

Be it known that I, JOHN W. EVANS, of Cleveland, in the county of Cuyahoga and State of Ohio, have invented certain new and useful Improvements in Apparatus for Extracting Oil from Seeds; and I do hereby declare the following to be a full, clear, and exact description of the invention, such as will enable others skilled in the art to which it pertains to make and use it, reference being had to the accompanying drawings, which form a part of this specification.

My invention relates to apparatus for the manufacture of seed-oil; and it consists in an improved percolator, the particular features and construction of which will more fully and at large appear in the following specification.

Figure 1:
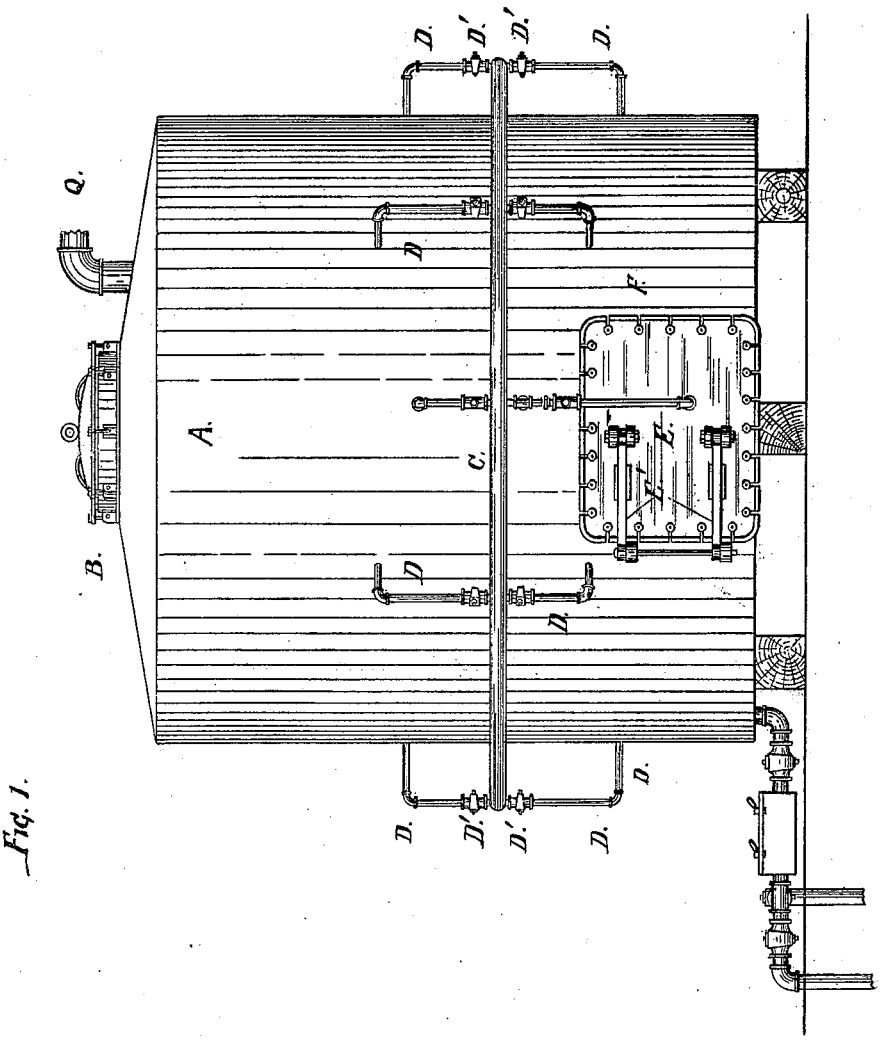
Figure 6:
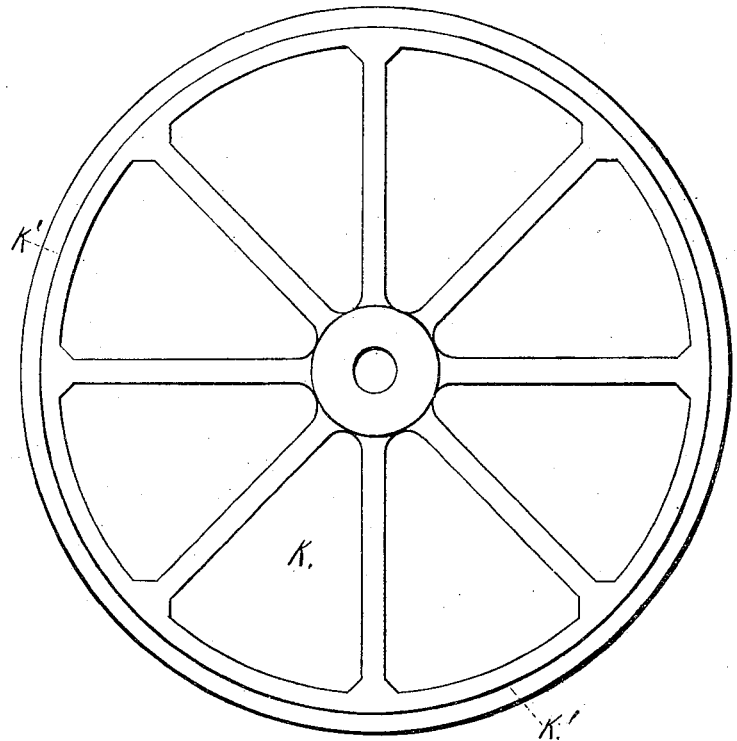
Figure 7:
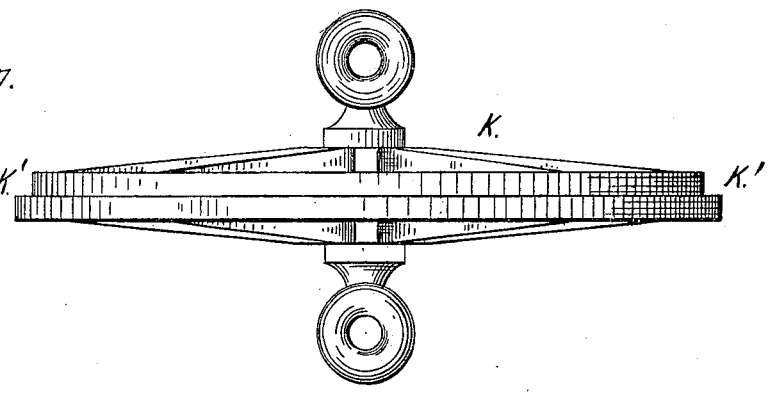
Figure 8:
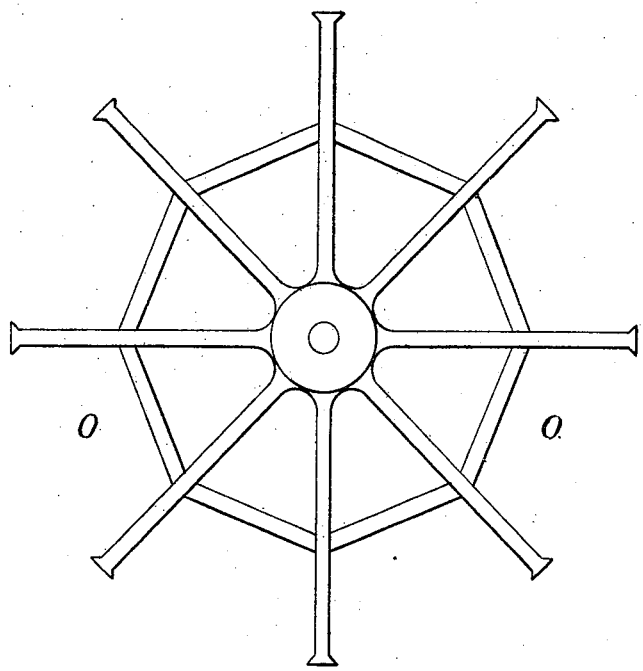
Figure 9:
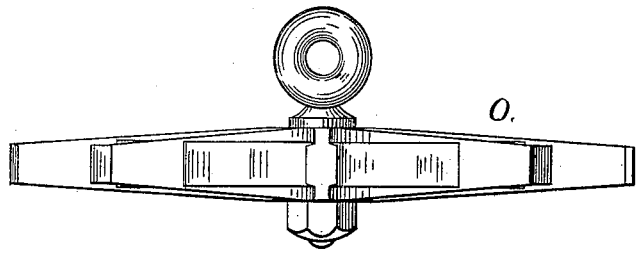

In the drawings, Figure 1 represents in side elevation a percolator constructed according to my invention. Fig. 2 represents the same with a portion removed, to show its interior and the parts therein contained. Fig. 3 is a detached plan view, showing the cross-bar, from which is suspended the spider and central breaker. Fig. 4 is a detached view, showing in detail the construction of one of the interior breakers and steamers. Fig. 5 is a plan view of the device shown in Fig. 4. Fig. 6 is a plan view of the spider supporting the inner swinging ends of the breakers. Fig. 7 is a view in side elevation of the spider shown in Fig. 6. Figs. 8 and 9 are plan and side views of the central and pendent breaker shown in side elevation in Fig. 2. Fig. 10 is a front view of the door of my percolator, and Fig. 11 is a plan view of said door.

A is a closed tank or container, preferably constructed from boiler-iron, and jacketed to prevent the radiation of heat.

B is a man-hole provided with a suitable cover or lid constructed to be securely and tightly applied.

C is a main steam-pipe surrounding the tank A.

D D D are branch steam-pipes extending from the main pipe C, and each provided with a suitable valve or stop-cock, D'. The branch pipes D enter and open into the interior of the tank A. These branch pipes may be of any suitable number, and may be constructed in any manner so long as they shall enter and open into the interior of the tank A to supply steam therein.

E is the door of my percolator. This door swings upon a compound hinge consisting of one, two, or more links, E', having journal or hinge-connections at one end with the middle portion of the door, and at the other with the walls of the tank or retort A. This method of hinging the door to the tank enables me to close and open the door by a direct or rectilinear motion, instead of upon the arc of a circle, as would be the case if the door was hinged in the ordinary manner, and this will be recognized as an important feature when it is remembered that the door must be closed steam-tight. The bearing-faces between the tank and its door are (one or both) preferably provided with rubber or some equivalently-yielding and elastic material for insuring a tight joint when the door is closed; and to effect this object more completely I have found it useful in practice to coat or daub the uniting-surfaces with a compound of tallow and black lead, or some equivalent substance, for preventing undue adhesion on account of the heat, to which the uniting-faces must be subjected, so that when the door is open these uniting-surfaces may readily part without sticking, or any liability of injury to the rubber cushion.

F F are swinging bolts pivotally attached to the door-frame or to the tank-body, and constructed to be dropped into the slots F' of the door, and when thus dropped into position the nuts F² are tightened, and the door thus securely held against the tank-body. I provide these swinging bolts entirely around the door, as indicated in the drawings, and any suitable number of these bolts may be provided for effecting the purpose specified. When the door is to be opened it is only necessary to loosen without removing the nuts F², when the bolts F may be quickly swung out of the slots F' and the door left free to swing upon its hinges.

G is a cross-bar spanning and bolted to the rim of the man-hole B. The middle portion of the cross-bar is constructed with a slot or elongated opening, G'. With this slot G' engages a button, H, from which is suspended by a suitable chain or cable the supporting-spider K. Thus suspended, it will be seen that the spider K hangs centrally within the chamber of the tank A. This spider is swung at such a height as to maintain the breakers L in substantially a horizontal position. The free or swinging end of the breakers L rest loosely upon the ledge K' of the spider K.

The construction of the spider K, as sufficiently indicated in the drawings, is of an open or wheel-like character, although, if preferred, it may be made in the form of a solid or imperforate disk, as it is intended to perform the double function of a support to the breakers L, and the function of a breaker besides.

The breakers L consist, essentially, of a swinging perforated steam-pipe, which may or may not be provided with metallic arms L'. The drawings illustrate the breaker as constructed of an arm and a perforated steam-pipe. Instead of this construction, however, the breakers may be a single structure, made hollow, and suitably perforated to admit the escape of steam, and, at the same time, to perform the function hereinafter pointed out. These breakers, which may be of any suitable number—say eight, more or less—are attached to the inside of the wall of the tank A by any suitable flexible or trunnion steam or gas-pipe joint that will admit of the introduction of steam into the breakers L, and at the same time permit the breakers to have a free vertically-swinging motion. These breakers L, as already intimated, are designed to be maintained in their horizontal position by resting upon the spider K; and when the button H is turned, so as to drop through its slot G, the spider will fall, and the breakers, being disengaged therefrom, will also fall; the reason for and effect of which will hereinafter be more fully explained.

O is a pendent breaker centrally suspended from the spider K. This breaker may be constructed in the same manner as the spider just described; or it may consist of a hub with radiating arms only. The precise construction of the breaker O is a thing to which my invention is not limited.

The floor of the tank A, like its walls, is pierced with a suitable number of the branch steam-pipes D. These pipes that enter up through the floor of the tank operate not only to furnish steam, as do the pipes entering the wall, but I also employ them in draining off the fluid contents of the tank.

The use and operation of my device may be described as follows: After the tank has been cleaned, suitable strainers, P, are placed over the mouths of the pipes D, that come up through the floor of the tank. Over these strainers are preferably placed coarse cloths, or any other equivalent porous substance through which the oil can filter without permitting the passage of meal. The door E is now closed and securely bolted, as described. The tank is now ready for charging, and it is filled with ground seed through the man-hole B. The tanks which I have used in demonstrating my invention contain about seven hundred and fifty bushels of seed meal. To this quantity of meal after it is placed in the tank is added about one hundred and ten barrels of naphtha or gasoline. The action of the naphtha is to cut or extract the oil from the meal, and the combined naphtha and seed-oil escapes through the vent-pipe A' of the tank A. During this process the contents of the tank are cold. After the oil and naphtha has drained away as much as it will, steam is admitted through the pipes D and breakers L. Meanwhile the contents of the tank become solidified, and in so doing pack and settle. The function of the breakers and spider will now be apparent. In settling past these breakers crevices, openings, or breaks will be made in the body of the meal, into which the steam will escape, and thus obtain a thoroughly intimate admixture with the entire contents of the tank. The steam is employed for driving from the meal, after its oil has been extracted, all of the remaining naphtha, because if this naphtha is permitted to remain the meal is thereby totally unfit for its well-known use as animal food. After steam has been admitted to the interior of the tank for the purpose aforesaid a suitable vent or outlet, Q, for the vapors generated is provided through the top of the tank, through which escape the steam and vapor of naphtha. Suitable condensing apparatus (which are here neither shown nor described) receive the naphtha vapors. After the meal contained in the tank A has been thoroughly purged of its naphtha it is ready to be taken from the tank and converted into oil-cake or otherwise prepared for animal food. The removal of the meal from the tank is effected by first opening the door E and shoveling away a sufficient quantity of the meal from beneath the breakers L O. After a considerable quantity of the meal has been thus removed the button H is turned so as to drop through its slot G', thus destroying the support of the spider K and pendent breaker O, which suddenly fall, and in falling the breakers L are released from their rest upon the spider K, and thus dropped by swinging from their pivotal or trunnion attachments to the walls of the tank A. The mass of meal above the breakers, thus suddenly left unsupported, immediately falls in a broken condition to the floor of the tank, which floor I construct on an incline from all directions toward the door, so that when the material drops, as just described, it is discharged by its own gravity from the door of the tank.

It is the provision of a door at the bottom of a stationary tank that constitutes one of the most important features of my invention.

Heretofore in the manufacture of seed-oil it has been customary to employ a tank swung upon trunnions at or near its balancing-point, and open at the top only for the charging and discharging of the meal, so that after the oil had been extracted it was necessary to invert the tank by turning it upon its trunnions, in order to clear it of its meal, thus necessitating the breaking of all steam, oil, and vapor pipe connections with the tank whenever it was swung upon its trunnions. Moreover, it necessitated the employment of a tank of moderate size, whereby only a comparatively small amount of meal could be treated at a single time, a one-hundred-and-fifty-bushel tank being considered very large, whereas by the employment of my invention I charge into the tank seven hundred and fifty bushels, and could just as easily construct and operate a tank for accommodating a thousand bushels, or more.

By the employment of the door I am enabled to use a stationary tank of almost any capacity, and I avoid the necessity of ever breaking or disturbing any of the steam, vapor, or oil pipe connections of the tank.

Another feature of my invention which I consider entirely novel with myself is the employment of one or more breakers, which may or may not be so constructed as to discharge steam into the body of the material contained in the tank.

I therefore do not limit my invention to the employment of any specific construction of breakers, nor to any particular number of them; nor is it material how the pendent breakers shall be suspended in their position or how they shall be released and permitted to drop. The button-and-slot arrangement is one which I have employed and found useful for this purpose; but it is apparent that an indefinite variety of mechanical arrangements could be employed instead of the said button-and-slot device.

After the meal has been removed from the tank steam may be admitted through the pipes D, which will operate to clear them of any material that may be clogging them.

In addition to the function already described for the breakers may be added their use in affording a support to the body of meal above them, thus preventing any undue packing at the lower portion of the tank, which would otherwise result, which packing would materially affect the porosity of the meal under the breakers, by making it more solid, and therefore less apt and ready to drain off its oil. Through the supporting action of the breakers the meal in the lower portion of the tank is always maintained sufficiently porous, and the oil can thus easily separate and escape; and after the oil has been drained off this porous condition of the meal admits of the easy and thorough permeation of steam throughout the entire mass of the meal contained in the tank, thus effecting a complete separation and driving out of the naphtha.

I have described my invention as employed for the purpose of the manufacture of linseed-oil; but the same process and the same mechanism herein described will answer as well for the extraction of oil from cotton-seed or any other oleaginous seed, as well as linseed.

What I claim is—

1. In an apparatus for extracting oil from seed, a stationary tank or container provided with a man-hole at its upper end, a door at the lower portion of its side wall and inclined bottom, of supports located within the tank or container between its top and bottom, and a series of steam-inlet pipes or conduits for distributing steam throughout different portions of the tank or container, substantially as set forth.

2. In an apparatus for extracting oil from seed, a stationary tank or container provided with a man-hole at its upper end and a door at its lower end, of swinging supports located within the tank or container, between its top and bottom, substantially as set forth.

3. In an apparatus for extracting oil from seed, a stationary tank or container provided with a man-hole at its upper end and a door at its lower end, of swinging steam-conduits located within the tank, substantially as set forth.

4. In an apparatus for extracting oil from seed, the combination, with a tank or container, of one or more breakers pivoted at one end, substantially as set forth.

5. The combination, with a tank or container, of a central pendent spider or support, and one, two, or more swinging breakers hinged or pivoted at one end and loosely resting at the other end upon said spider, substantially as and for the purposes shown.

6. In combination with a tank or container a combined breaker and support, hinged at one end and supported at its other end by a detachable support, substantially as and for the purposes specified.

7. The combination, with a tank or container, of a central suspended spider or support, and a number of breakers, said breakers resting at one end upon said spider and hinged or pivoted at their other end, substantially as and for the purposes shown and described.

8. In an apparatus for extracting oil from seed, the combination, with a tank or container, of one or more pivoted breakers constructed to convey and discharge steam within the tank or container, substantially as set forth.

9. In an apparatus for extracting oil from seed, the combination, with the stationary tank or container, of the breaker O, and devices for suspending it from the top of the tank, substantially as set forth.

10. The combination, with a tank or container, of a number of breakers converging toward and supported by a spider, K, or its mechanical equivalent, said spider constructed to be dropped in such a manner as to release its support of said breakers, substantially as and for the purposes specified.

11. A spider, K, or its mechanical equivalent, detachably suspended within the tank or container A, substantially as and for the purposes specified.

In testimony whereof I have signed my name to this specification in the presence of two subscribing witnesses.

JOHN W. EVANS.

Witnesses:
L. L. LEGGETT,
W. E. DONNELLY